2,721,376
Patented Oct. 25, 1955

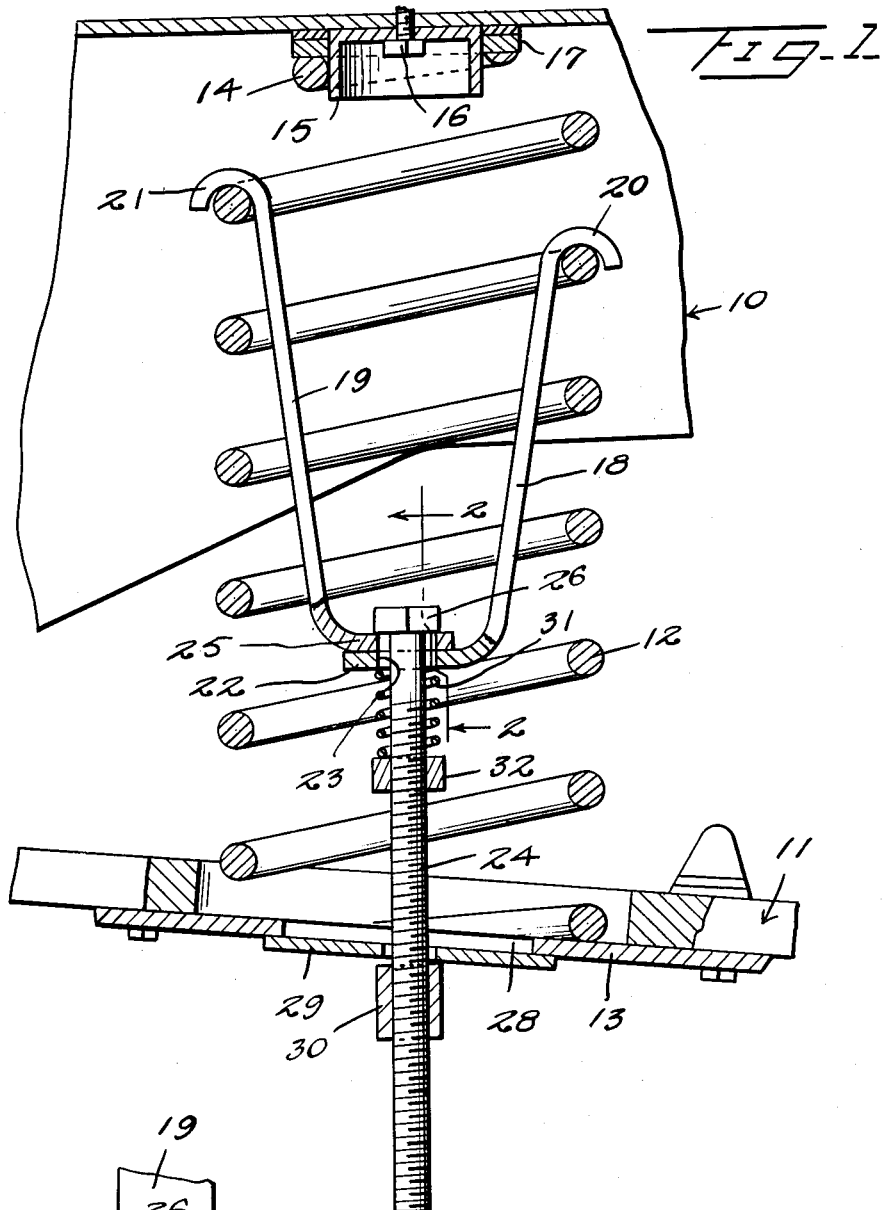

United States Patent Office 2,721,376

COIL SPRING SPACER INSERTION TOOL

Paul E. Showman, Broken Arrow, Okla., assignor to The Showman Tool Company, Broken Arrow, Okla., a corporation Application May 22, 1952, Serial No. 289,366

1 Claim. (Cl. 29—227)

This invention relates to a device for facilitating the insertion of a spacer between one end of a spring and the frame or chassis of a vehicle.

In a vehicle suspension means wherein the wheels are mounted on rock levers or knuckles, a coil spring is inserted between the levers and the vehicle chassis or frame. The lower end of the spring sets in a recess of the rock lever and the upper end of the spring engages about a cup which is secured to the chassis or frame. The need for spacers being installed arises from the fact the coil springs will normally weaken in the first 15,000 miles of operation. After a certain amount of flexing, the strength of the spring stabilizes and weakens no more. However, the sag of the spring has allowed the front of the car to drop, making the wheels sprawl. This causes misalignment, bad steering, hard riding and very fast wear on the inside tread of the front tires. One ⅛ inch thick spacer on each side of the car will increase the pressure on the coil springs enough to raise it about 2½ inches. Two spacers on each side may be installed if necessary. The spacers economically and efficiently correct the bad conditions listed above. The insertion of the spacer is a time consuming operation, and in order to provide a means whereby this spacer may be installed in a relatively short time, I have provided a spring holding device which is adapted to compress the spring beyond the tension which is normal when the weight of the vehicle is on the springs, so that the chassis may be jacked up or otherwise raised above the upper end of the spring.

Another object of this invention is to provide a device of this kind which can be used with different types and makes of vehicles.

A further object of this invention is to provide a device which will firmly hold the spring under compression so that the spring will not accidently be permitted to expand while either replacing complete A frame assemblies on some makes and/or inner control shafts and bushings on all makes, or any part of the assembly.

A further object of this invention is to provide a safety tool which by simply inserting this tool and removing all the spring pressure from the A frame makes any major front end job safer.

With the above and other objects in view, my invention consists in the arrangement, combination and details of construction disclosed in the drawings and specification, and then more particularly pointed out in the appended claim.

In the drawing:

Figure 1 is a fragmentary vertical section of a vehicle chassis and suspension means therefor, having a spring compression device disposed in spring compressing position constructed according to an embodiment of this invention.

Figure 2 is a fragmentary sectional view taken on the line 2—2 of Figure 1.

Referring to the drawing, the numeral 10 designates generally a vehicle chassis or frame and the numeral 11 designates generally a rock lever disposed below the frame 10 and carrying a wheel or axle. A coil compression spring 12 is interposed between the lever 11 and the chassis or frame 10 and is seated at its lower end on a plate 13 carried by the lever 11.

The upper end of the spring 12 is formed with a reduced diameter eye 14 which engages about an inverted cup-shaped member 15 secured by fastening means 16 to the frame or chassis 10. A rubber spacer or shim 17 of ring shape is disposed about the cup member 15 and is interposted between the eye 14 and the chassis or frame 10.

The eye or ring 14 is unsecured with respect to the frame or chassis 10 and where it is necessary to install the spacer 17, under prior practice the frame or chassis 10 is elevated by a crane or other suitable jack and at this time the spring 12 expands so that the frame or chassis 10 must be elevated to a substantial height in order to free the ring 14 from the cup 15. The drawing details the dis-assembly of the A frame necessary before the spring may be released.

Under prior practice, the installation of the spacer 17 has been a time consuming operation and in order to provide a means whereby the spacer or shim 17 may be installed in a relatively short time, I have provided a spring contracting or holding device, as will be hereinafter described.

A pair of upwardly divergent rigid arms or bars 18 and 19 are formed at their upper ends with downturned hooks 20 and 21, respectively, and the hooks 20 and 21 are adapted to engage over adjacent convolutions of the spring 12. Arm or bar 18 is provided at its lower end with an inwardly projecting extension 22 having an opening 23 through which an elongated threaded bolt 24 is adapted to loosely engage.

Arm or bar 19 is also provided with an angularly disposed extension 25 overlying the extension 22 and interposed between the head 26 of the bolt 24 and the extension 22. A pair of downturned flanges 27 are carried by the opposite edges of the extension 25 and engage on opposite edges of extension 22 so that the two arms or bars 18 and 19 will be held against turning movement one relative to the other.

The bolt or threaded shaft 24 extends through the relatively large opening 28, which is formed in the spring supporting plate 13, and a disc shaped plate 29 is loosely mounted on the bolt or shaft 24 and extends across the opening 28 and bears against the lower side of plate 13. A spring tensioning nut 30 is threaded on the bolt or shaft 24 and bears against the plate 29.

In order to provide a means whereby the hooked arms or bars 18 and 19 will be resiliently biased away from each other so that the hooks 20 and 21 will automatically hook onto the desired convolutions of the spring 12, I have provided a spring 31 which engages about the shaft 24. The upper end of spring 31 bears against the lower extension 22 and the lower end of the spring 31 bears against a spring tensioning nut 32, which is threaded on bolt or shaft 24.

In the use and operation of this device, when it is desired or necessary to install the spacer ring 17, the spring tensioned arms or bars 18 and 19 are inserted interiorly of spring 12 by extending the arms 18 and 19 upwardly through the lower plate opening 28. The arms 18 and 19 are moved upwardly to the upper portion of spring 12 and when they are in the desired upper position, spring 31 will resiliently swing arms 18 and 19 outwardly so that the hooks 20 and 21 will engage over adjacent convolutions or spring 12.

Plate 29 is of a diameter greater than the diameter opening 28 so that plate 29 will bear against the lower side of plate 13. Nut 30 is then moved upwardly or threaded upwardly on bolt or shaft 24 so as to tightly secure arms 18 and 19 in spring compressing or holding position.

The vehicle frame or chassis 10 may then be elevated by a crane or other jack means so that the eye 14 of spring 12 will slip off of cup 15. Spacer 17 may then be removed from cup 15 or an additional spacer installed. After spacer 17 has been installed, vehicle 10 may be lowered so that eye 14 will be disposed about cup 15. This spring holding or compressing device will permit the normal operation of installing the spacer to be performed in a relatively short time without permitting the spring to expand.

By providing the spring-pressed hook members 18 and 19, which are loosely mounted on the threaded shaft or bolt 24, the device hereinbefore described may be used with different types or makes of vehicles having coil spring suspension means of the type hereinbefore described.

I do not mean to confine myself to the exact details of construction herein disclosed, but claim all variations falling within the purview of the appended claim.

What is claimed is:

A coil spring spacer insertion tool comprising an elongated threaded bolt having an enlarged head at one end thereof, a pair of elongated flat bars having a substantially rectangular transverse cross-sectional configuration, one of said bars having one end portion thereof off-set at an obtuse angle and its other end reversely bent to provide a hook, said one end portion having an opening therein substantially greater than the diameter of said bolt, the second of said bars having one end portion thereof off-set at an obtuse angle and its other end reversely bent to provide a hook, said off-set end portion of said second bar having a laterally extending flange at each side thereof and a transversely extending opening therebetween substantially greater than the diameter of said bolt, said off-set end portion of said second bar overlapping said off-set portion of said first bar with said flanges of said second bar extending the edges of said off-set portion of said first bar and said openings being substantially in registry, said bolt extending loosely through said openings whereby said first and second bars may be transversely pivoted with relation to each other and said bolt and with said head thereof engaging said off-set portion of said second bar, said bars diverging in a direction away from the longitudinal axis of said bolt, a helicoidal spring mounted on said bolt and having one end thereof abutting said off-set end portion of said first bar and engaging the compression nut mounted on said bolt and its other end of said spring, said second bar having its longitudinal dimension greater than the longitudinal dimension of said first bar whereby upon insertion of the tool axially within said coil spring said hooks engage over a pair of separate convolutions thereof, a second nut mounted on said bolt and a disc loosely mounted on said bolt intermediate said first and second nuts, said disc being adapted to engage a fixed element adjacent said coil spring whereby with said hooks engaging said convolutions of said coil spring and said disc engaging said element, rotation of said second nut effects movement of said hook ends of said bars toward said disc to compress said coil spring therebetween.

References Cited in the file of this patent

UNITED STATES PATENTS

| | | |
|---|---|---|
| 1,212,003 | Bean | Jan. 9, 1917 |
| 1,403,754 | Erickson | Jan. 17, 1922 |
| 1,838,738 | Bradley | Dec. 29, 1931 |

FOREIGN PATENTS

| | | |
|---|---|---|
| 295,828 | Great Britain | Aug. 23, 1928 |
| 783,475 | France | Apr. 8, 1935 |